(12) United States Patent
Heighton

(10) Patent No.: US 7,908,792 B2
(45) Date of Patent: Mar. 22, 2011

(54) EDGING ATTACHMENT FOR ILLUMINATED BORDER

(76) Inventor: Brent M. Heighton, Kalamazoo, MI (US)

( * ) Notice: Subject to any disclaimer, the term of this patent is extended or adjusted under 35 U.S.C. 154(b) by 123 days.

(21) Appl. No.: 12/026,096

(22) Filed: Feb. 5, 2008

(65) Prior Publication Data
US 2008/0184619 A1    Aug. 7, 2008

Related U.S. Application Data

(60) Provisional application No. 60/888,113, filed on Feb. 5, 2007.

(51) Int. Cl.
A01G 1/00    (2006.01)
(52) U.S. Cl. .............................. 47/33; 52/102
(58) Field of Classification Search ........ 47/33; 52/102; 362/152
See application file for complete search history.

(56) References Cited

U.S. PATENT DOCUMENTS

| 4,566,219 | A | 1/1986 | Firth |
|---|---|---|---|
| 4,945,675 | A | 8/1990 | Kendrick |
| 5,141,192 | A | 8/1992 | Adams |
| 5,230,187 | A | 7/1993 | Reimann |
| 5,410,458 | A | 4/1995 | Bell |
| 5,438,804 | A | 8/1995 | Reum et al. |
| 5,519,970 | A | 5/1996 | Reum et al. |
| 5,526,606 | A | 6/1996 | Beladakis |
| 5,535,545 | A | 7/1996 | Matz |
| 5,566,058 | A | 10/1996 | Protz, Jr. |
| 5,715,628 | A | 2/1998 | Beladakis |
| 5,768,824 | A | 6/1998 | Matz |
| D400,985 | S | 11/1998 | Risi |
| 5,857,493 | A | 1/1999 | Matz |
| 5,887,856 | A | 3/1999 | Everly, II |
| D418,233 | S | 12/1999 | Prassas et al. |
| 6,021,599 | A | 2/2000 | Matz |
| 6,123,443 | A | 9/2000 | Conway |
| 6,138,405 | A | 10/2000 | Matz |
| 6,186,645 | B1 | 2/2001 | Camarota |
| 6,328,459 | B1 | 12/2001 | Adams |
| D463,582 | S | 9/2002 | Conde |
| 6,494,594 | B1 | 12/2002 | Schroetter |
| 6,644,836 | B1 | 11/2003 | Adams |
| 6,652,112 | B1 | 11/2003 | Lucarelli |
| 6,955,458 | B2 | 10/2005 | Cheema |
| D520,647 | S | 5/2006 | Elmore et al. |
| 7,473,006 | B1 * | 1/2009 | Bollman ................ 362/152 |
| 2004/0129846 | A1 | 7/2004 | Adams et al. |
| 2006/0150479 | A1 * | 7/2006 | Saunders et al. ............ 47/33 |
| 2006/0277823 | A1 * | 12/2006 | Barnett et al. ............ 47/33 |

* cited by examiner

Primary Examiner — Rob Swiatek
Assistant Examiner — Kristen C Hayes
(74) Attorney, Agent, or Firm — Price, Heneveld, Cooper, DeWitt & Litton, LLP

(57) ABSTRACT

A lawn decoration comprising edging and a clip connected to the edging, the clip including a rope light accepting portion.

13 Claims, 12 Drawing Sheets

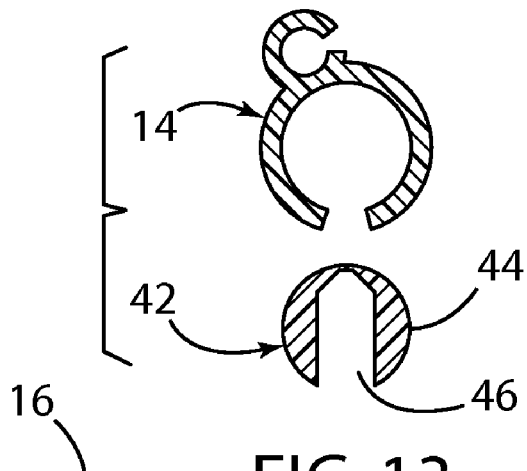
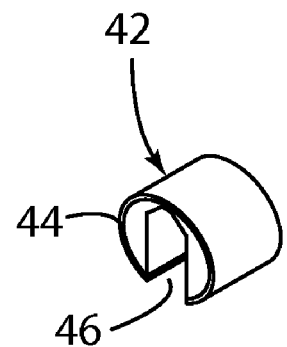
FIG. 13
FIG. 12
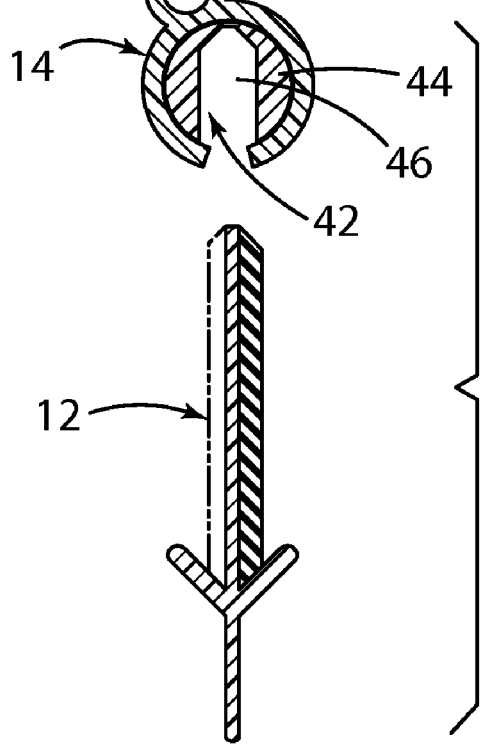
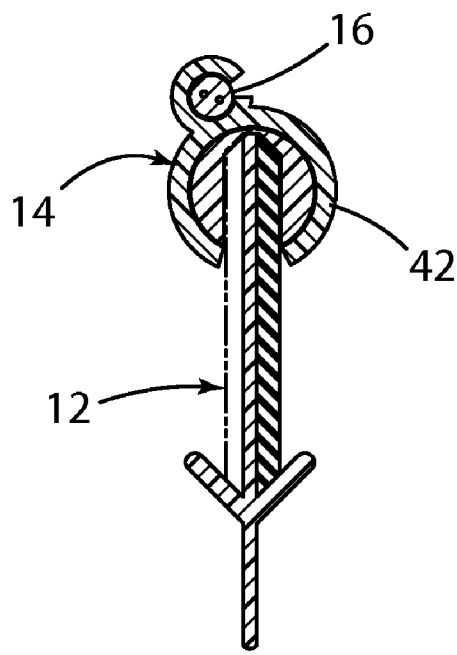
FIG. 14
FIG. 15

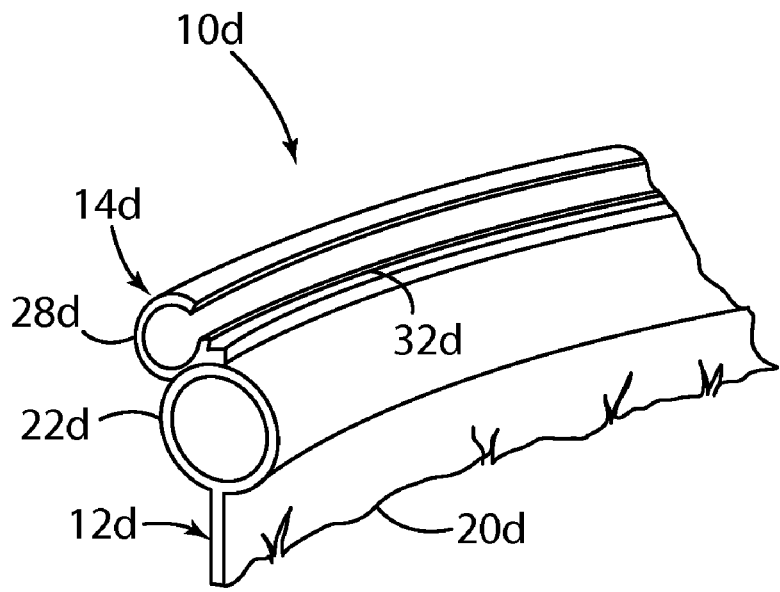
FIG. 20
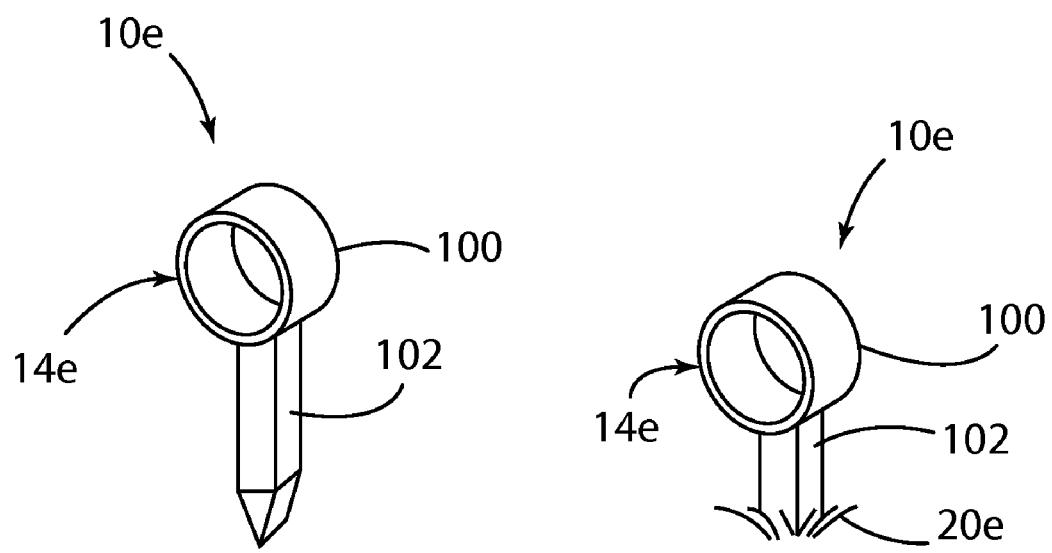
FIG. 21
FIG. 22

US 7,908,792 B2

EDGING ATTACHMENT FOR ILLUMINATED BORDER

This application claims the benefit of U.S. Provisional Patent Application No. 60/888,113, filed Feb. 5, 2007.

FIELD OF THE INVENTION

The present invention concerns borders for edging, and more particularly relates to illuminated borders for edging.

SUMMARY OF THE PRESENT INVENTION

An aspect of the present invention is to provide a lawn decoration comprising edging, a clip and a rope light. The edging includes an elongated post portion for sticking into the ground and an elongated enlarged top at a top of the post portion. The clip is connected to the edging. The clip includes at least one top portion and a rope light accepting portion, with the top portion covering more than 270 degrees of a circle and defining an opening. The clip is connected to the edging by placing the top of the edging into an area defined by the top portion of the clip through the opening. The rope light is located in the rope light accepting portion of the clip.

Another aspect of the present invention is to provide a lawn decoration comprising a clip and a rope light. The clip is for connecting to edging. The clip includes at least one annular top portion and a rope light accepting portion, with the annular top portion extending in a circle for almost 360 degrees. The annular top portion includes an opening for accepting a circular top of the edging therein to connect the clip to the edging. The rope light extends through the rope light accepting portion of the clip.

Yet another aspect of the present invention is to provide a lawn decoration comprising edging, a clip and a rope light. The edging includes an elongated planar post portion for sticking into the ground and defining a divided area in a yard. The clip is connected to the edging. The clip includes a top portion and a rope light accepting portion, with the top portion having an opening for accepting a top of the elongated planar post portion of the edging therein. The rope light receiving portion is substantially annular and includes a slot. The clip is connected to the edging by placing the top of the edging into the opening. The rope light is located in the rope light accepting portion of the clip through the slot.

These and other aspects, objects, and features of the present invention will be understood and appreciated by those skilled in the art upon studying the following specification, claims, and appended drawings.

BRIEF DESCRIPTION OF DRAWINGS

FIG. 12 is a perspective view of an adapter for use with the illuminated border of the present invention.

FIG. 13 is an end view of a clip and the adapter of the illuminated border of the present invention in a first assembly step.

FIG. 14 is an end view of the clip and the adapter of the illuminated border of the present invention in a second assembly step.

FIG. 15 is an end view of the clip and the adapter of the illuminated border of the present invention in a third assembly step.

FIG. 20 is a perspective view of a fifth embodiment of an illuminated border of the present invention.

FIG. 21 is a perspective view of a sixth embodiment of an illuminated border of the present invention.

FIG. 22 is a perspective view of the sixth embodiment of an illuminated border of the present invention.

DETAILED DESCRIPTION OF PREFERRED EMBODIMENTS

Figure 1:
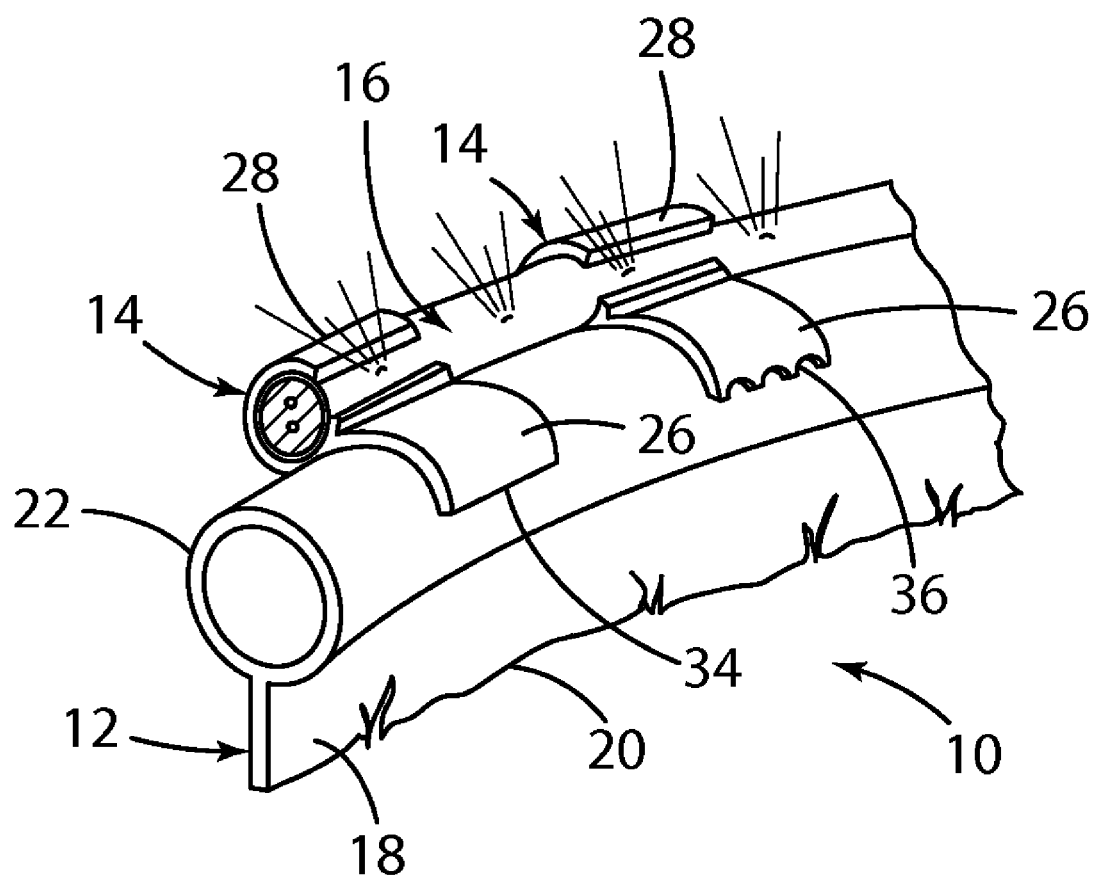
FIG. 1 is a perspective view of a first embodiment of an illuminated border of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIGS. 1-6) generally designates an illuminated border embodying the present invention. In the illustrated example, the illuminated border 10 comprises landscape and/or border edging 12, a plurality of clips 14 and a rope light 16. The plurality of clips 14 are used to attach the rope light 16 to the landscape edging 12 to provide illumination to the landscape edging 12. The rope light 16 is well known to those skilled in the art and includes at least one illuminated wire within a circular enclosure. The rope light 16 includes a plug at one end for inserting into a socket to illuminate the rope light 16. The rope light 16 is preferably flexible to allow the rope light 16 to be curved.

Figures 2, 3, 4:
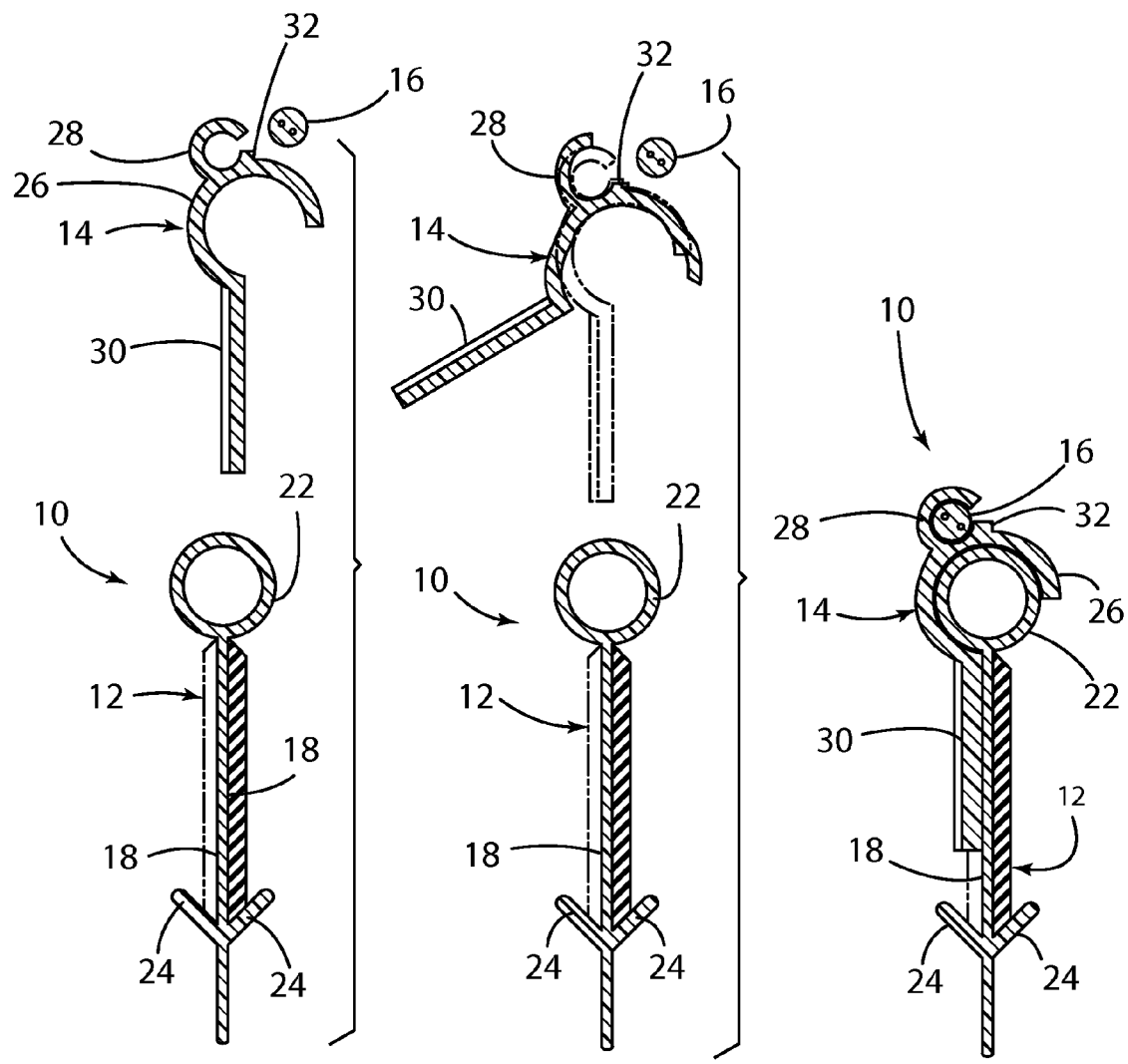
FIG. 2 is an end view of the first embodiment of the illuminated border of the present invention in a first assembly step.
FIG. 3 is an end view of the first embodiment of the illuminated border of the present invention in a second assembly step.
FIG. 4 is an end view of the first embodiment of the illuminated border of the present invention in a third assembly step.

In the illustrated example, the landscape edging 12 comprises typical landscape edging as is well known to those skilled in the art. The landscape edging 12 is typically used to separate two portions of a person's yard (e.g., separating woodchips from grass). The landscape edging 12 comprises a vertical panel 18 configured to be inserted into the ground 20 and an elongated, enlarged top portion 22. In the illustrated example, the top portion 22 can be substantially circular. However, it is contemplated that the top portion 22 could define a square, a rectangle or any enlarged geometric shape. As illustrated in FIGS. 2-4, the vertical panel 18 can include a pair of angled projections 24 forming a prong for maintaining the landscape edging in the ground 20. It is contemplated that the landscape edging 12 can be formed from extruded plastic and the top portion 22 can be solid or hollow (as illustrated). The clips 14 are configured to be connected to the top portion 22 of the landscape edging 12 to form the illuminated border 10.

Figure 5:
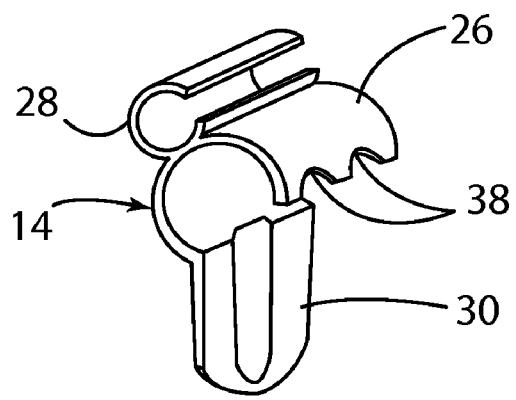
FIG. 5 is an alternative clip of the first embodiment of the illuminated border of the present invention.
Figure 6:
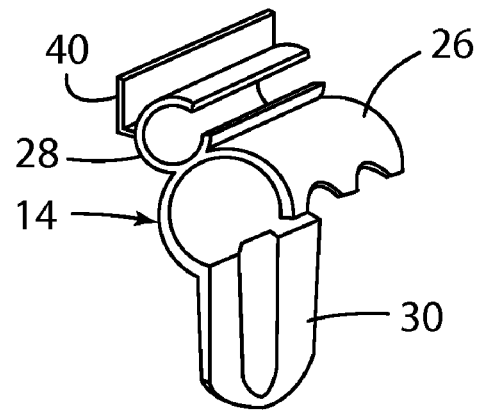
FIG. 6 is a second alternative clip of the first embodiment of the illuminated border of the present invention.
Figure 7:
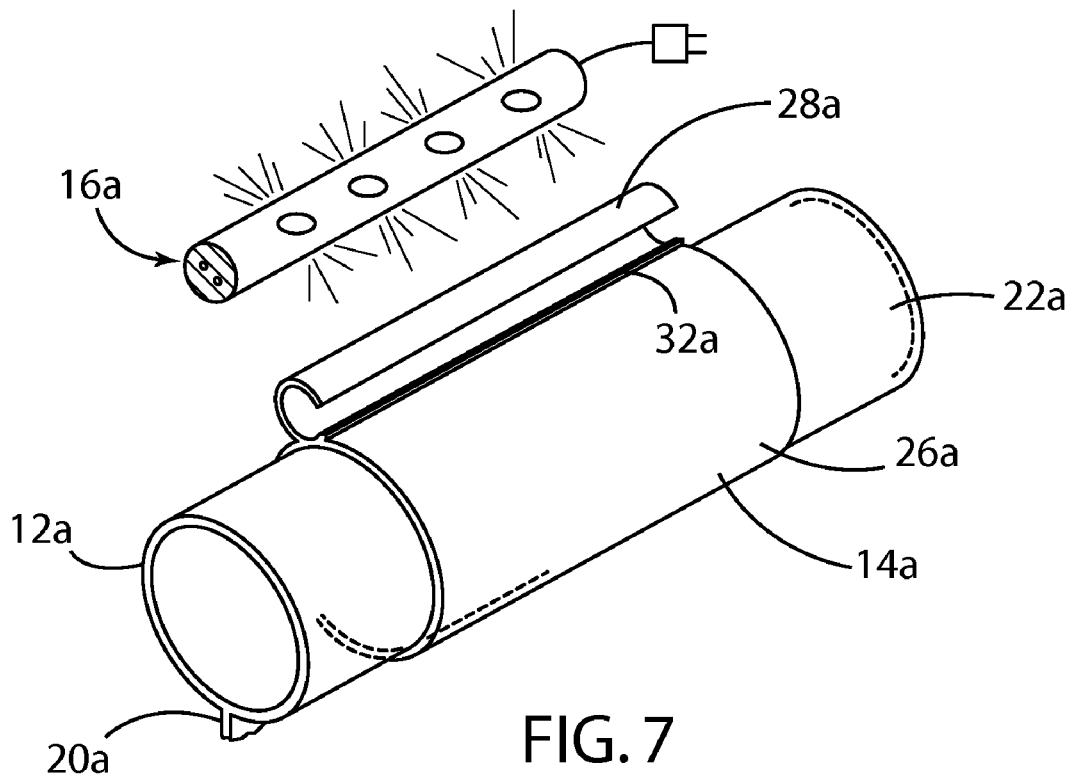
FIG. 7 is a perspective view of a second embodiment of an illuminated border of the present invention.
Figure 8:
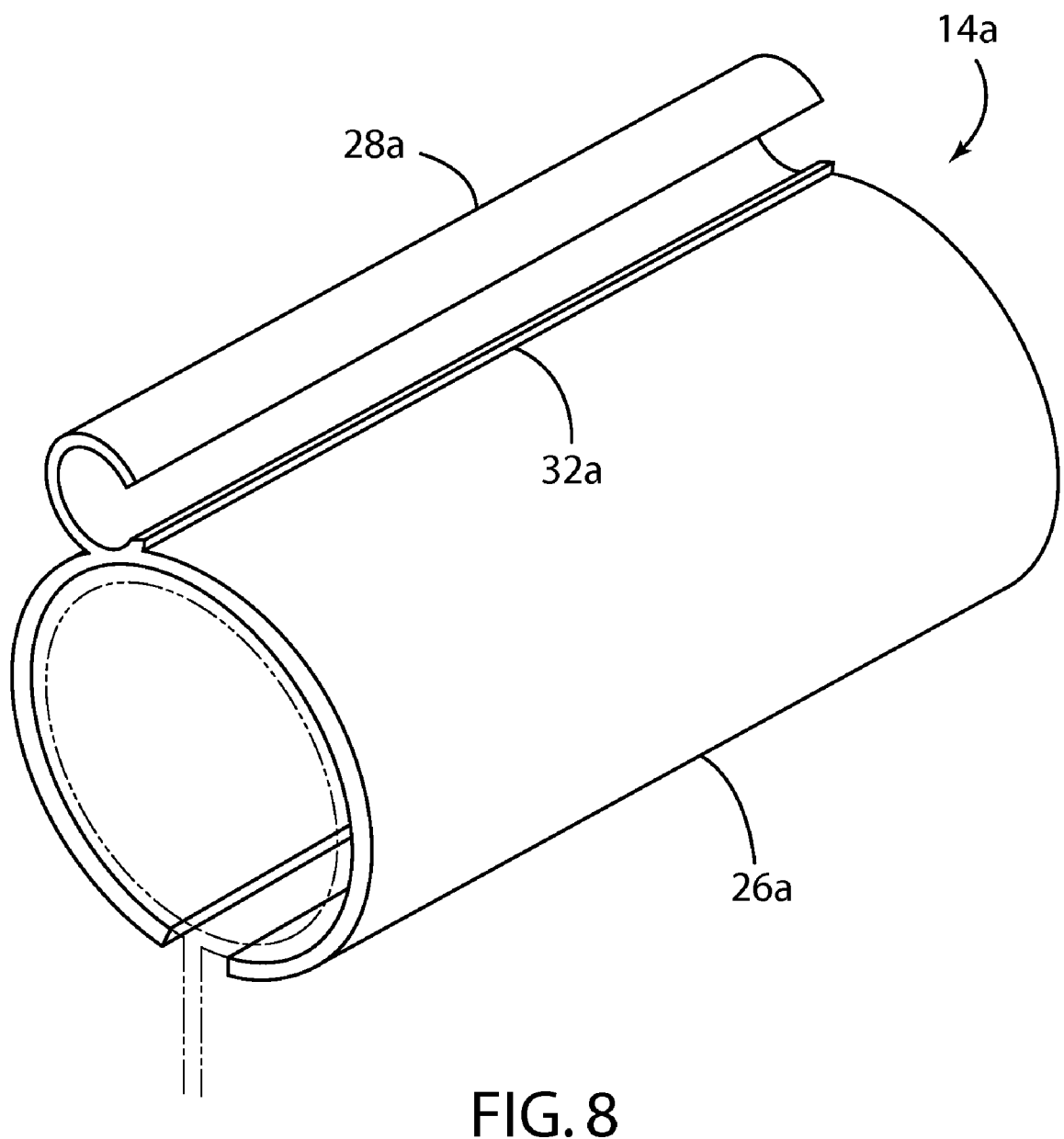
FIG. 8 is a perspective view of a clip of the second embodiment of an illuminated border of the present invention.
Figure 9:
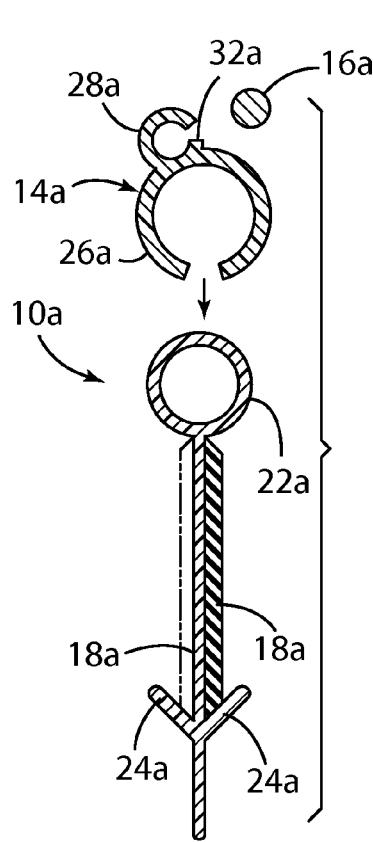
FIG. 9 is an end view of the second embodiment of the illuminated border of the present invention in a first assembly step.
Figure 10:
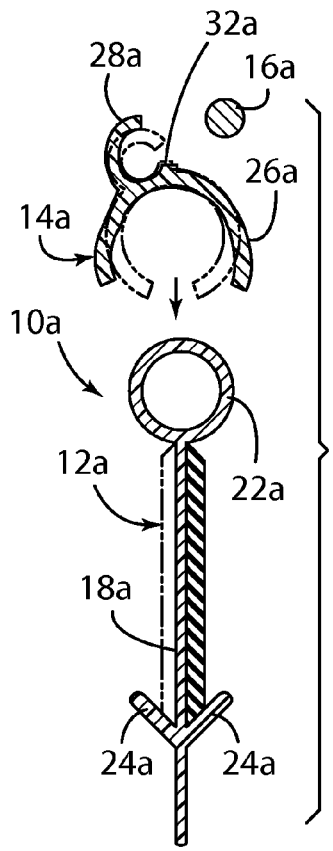
FIG. 10 is an end view of the second embodiment of the illuminated border of the present invention in a second assembly step.
Figure 11:
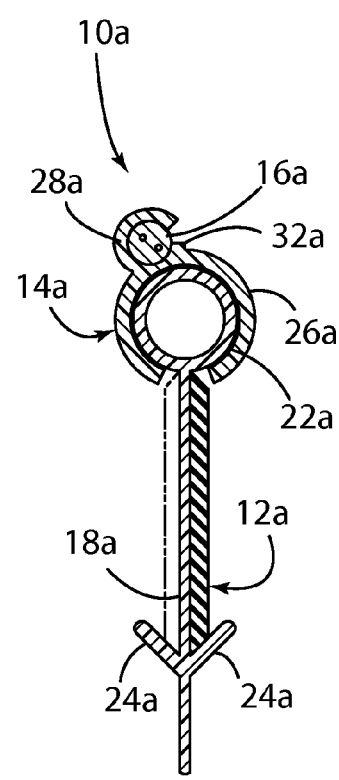
FIG. 11 is an end view of the second embodiment of the illuminated border of the present invention in a third assembly step.

The illustrated clips 14 comprise a portion 26 for connection to the landscape edging 12, a C-shaped cradle or rope light receiving portion 28 and a flange 30. In use, the C-shaped rope light receiving portion 28 is configured to accept the rope light 16 as shown in FIGS. 2 and 3. The top portion 22 of the landscape edging 12 is inserted into the portion 26 of the clip 14 and the clip 14 is rotated (if circular) until the flange 30 abuts against the vertical panel 18 of the landscape edging 12 as illustrated in FIG. 4, thereby providing the illuminated border 10. Preferably, the portion 26 extends for approximately 270 degrees of a circle (even if in a non-circular configuration). As illustrated in FIGS. 2-4, the portion 26 includes a flange 32 for assisting in maintaining the rope light 16 within the C-shaped rope light receiving portion 28, with the flange 32 forming part of the C-shaped rope light receiving portion or cradle 28. It is contemplated that the clips 14 can be formed from extruded plastic, by injection molding or out of metal. In the illustrated example, the clips 14 have a length of approximately one to four inches and a plurality of the clips 14 are spaced along the top portion 22 of the landscape edging 12 along the landscape edging 12. It is further contemplated that the clips 14 could not include the flange 30. As illustrated in FIG. 1, the clips 14 can have either a flat edge 34 at the end of the portion 26 or a saw tooth edge 36 at the end of the portion 26. Other end configurations are also contemplated. FIG. 5 illustrates an alternative clip 14, wherein the clip 14 includes an end of the portion 26 having a plurality of annular grooves 38. FIG. 6 illustrates a second alternative clip 14, wherein the clip 14 includes an L-shaped receiving leg 40 for accepting Christmas lights or a plant description card holder. It is contemplated that the L-shaped receiving leg 40 could be used with any of the clips 14 described herein (either above or below).

The reference numeral 10a (FIGS. 7-11) generally designates another embodiment of the present invention, having a second embodiment for the illuminated border. Since illuminated border 10a is similar to the previously described illuminated border, similar parts appearing in FIGS. 1-6 and FIGS. 7-11, respectively, are represented by the same, corresponding reference number, except for the suffix "a" in the numerals of the latter. The second embodiment of the illuminated border 10a includes a clip 14a that does not include the flange 30 of the first embodiment of the illuminated border 10a (although one could be used) and the portion 26a extends for approximately 360 degrees. It is contemplated that the clips 14 can be formed from extruded plastic, by injection molding or out of metal. In the illustrated example, the clips 14 have a length of approximately one to four inches and a plurality of the clips 14 are spaced along the top portion 22 of the landscape edging 12 along the landscape edging 12.

FIGS. 12-15 illustrate an adapter 42 that could be used with any of the clips described herein (either above or below). The adapter 42 is used to connect the clips 14 to landscape edging 12 that does not include a top portion 22. The adapter 42 comprises a tube 44 having a lower slot 46 therein. The lower slot 46 is configured to accept a top portion of the vertical panel 18 of the landscape edging 12. Furthermore, the tube 44 is configured to be inserted into the portion 26, 26a of the clip 14, 14a. Therefore, the adapter 42 allows the clips 14, 14a to be connected to landscape edging 12 that does not include the top portion 22. It is contemplated that the tube 44 could be solid or could have a hollow interior, with ends of the tube 44 having circular faces, thereby providing the tube 44 with a cylindrical body.

Figure 16:
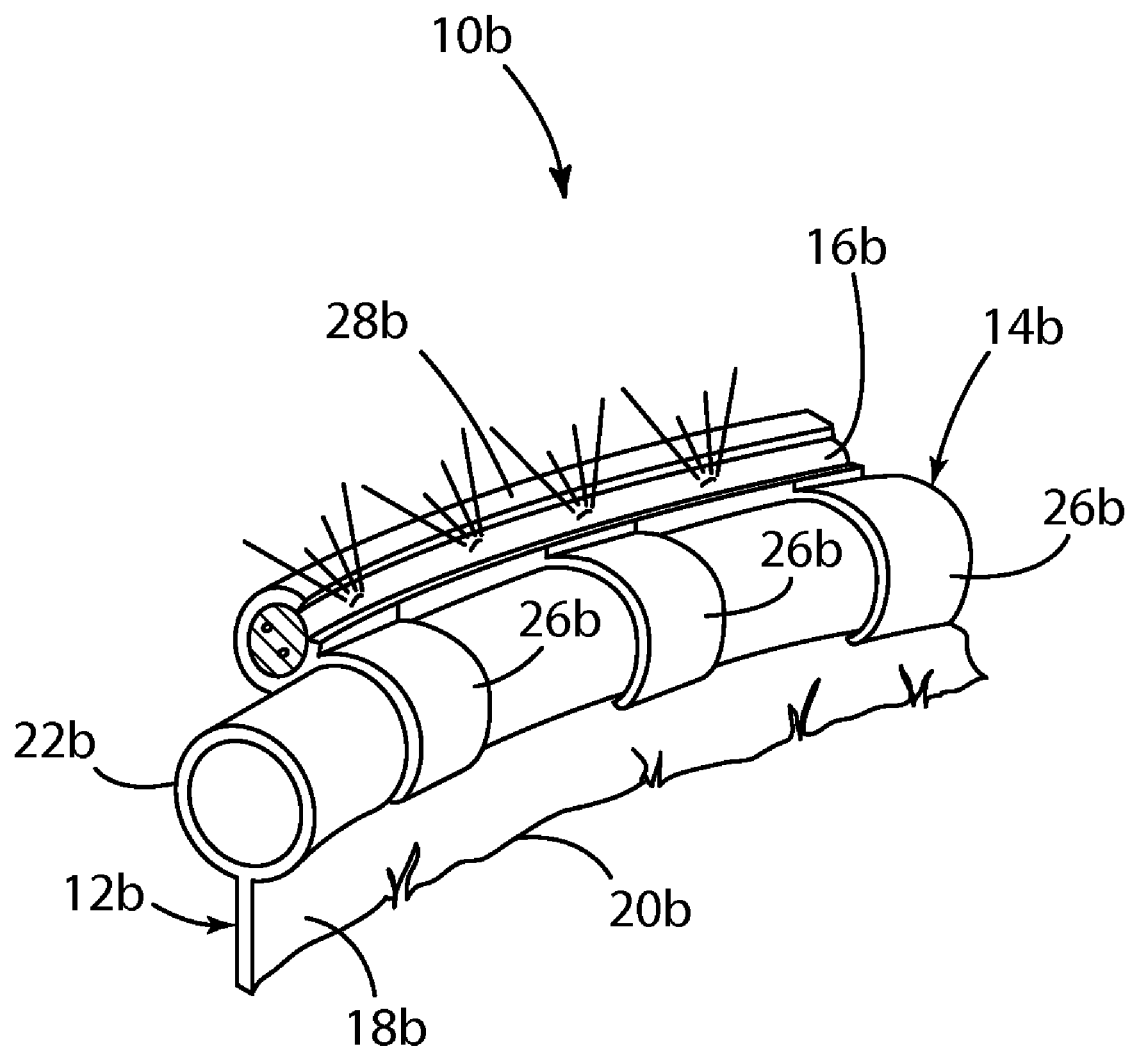
FIG. 16 is a perspective view of a third embodiment of an illuminated border of the present invention.

The reference numeral 10b (FIG. 16) generally designates another embodiment of the present invention, having a third embodiment for the illuminated border. Since illuminated border 10b is similar to the previously described illuminated border, similar parts appearing in FIGS. 1-6 and FIG. 16, respectively, are represented by the same, corresponding reference number, except for the suffix "b" in the numerals of the latter. The third embodiment of the illuminated border 10b includes a plurality of clips 14b that have a plurality of portions 26b for connection to the landscape edging 12b, but a single extended C-shaped rope light receiving portion 28b that extends along and is connected to all of the plurality of portions 26b of the clips 14b. It is contemplated that the clips 14b could include the flanges (similar to the flanges 30 above) and that the plurality of portions 26b could extend for approximately 360 degrees (as shown) or approximately 270 degrees. Furthermore, it is contemplated that the plurality of portions 26b could include any of the ends as described above in the first embodiment of the illuminated border 10. It is further contemplated that the clips 14b can be formed from plastic or metal. In the illustrated example, the plurality of portions 26b of the clips 14b have a length of approximately one to four inches and the plurality of the portions 26b of the clips 14 are spaced along the top portion 22b of the landscape edging 12b along the landscape edging 12b.

Figure 17:
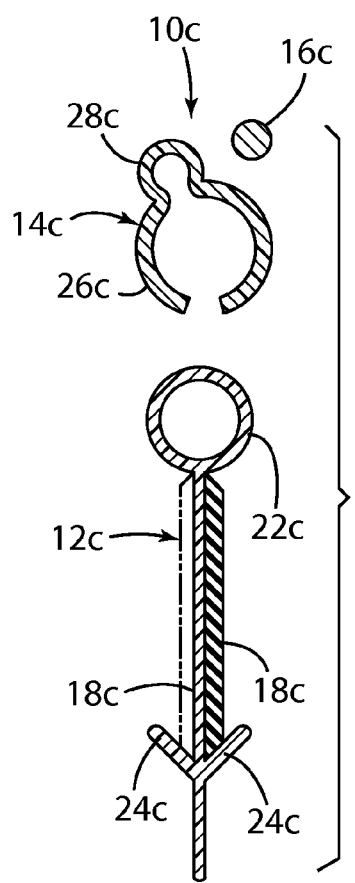
FIG. 17 is an end view of a fourth embodiment of the illuminated border of the present invention in a first assembly step.
Figure 18:
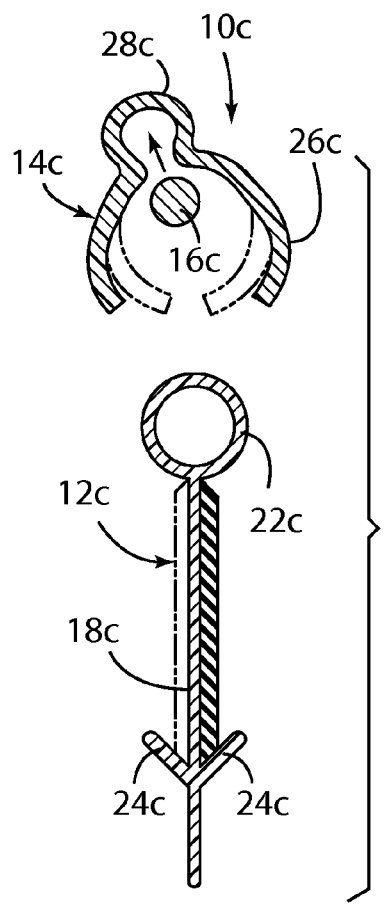
FIG. 18 is an end view of a fourth embodiment of the illuminated border of the present invention in a second assembly step.
Figure 19:
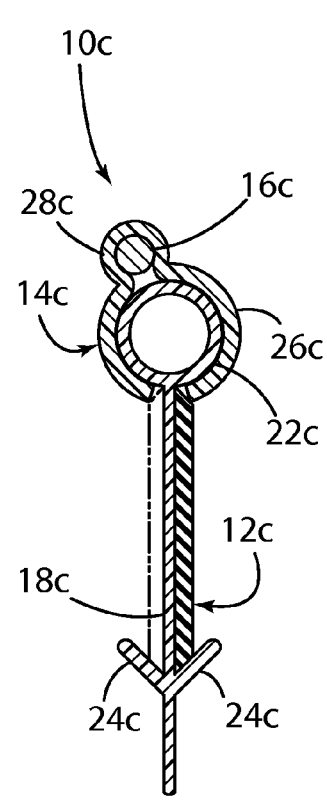
FIG. 19 is an end view of a fourth embodiment of the illuminated border of the present invention in a third assembly step.

The reference numeral 10c (FIGS. 17-19) generally designates another embodiment of the present invention, having a fourth embodiment for the illuminated border. Since illuminated border 10c is similar to the previously described illuminated border, similar parts appearing in FIGS. 1-6 and FIGS. 17-19, respectively, are represented by the same, corresponding reference number, except for the suffix "c" in the numerals of the latter. The fourth embodiment of the illuminated border 10c includes clips 14c having the entrance to the C-shaped rope light receiving portions 28c being located with the portions 26c of the clip 14c. Therefore, the rope light 16c must be inserted into the C-shaped rope light receiving portions 28c before the portions 26c of the clip 14c is connected to the adapter 42 or the top portion 22c of the landscape edging 12c (although it is contemplated that the rope light 16c could be threaded into the C-shaped rope light receiving portions 28c after the clips 14c have been connected to the landscape edging 12c). It is contemplated that the clips 14c could include the flanges 30 and that the plurality of portions 26c could extend for approximately 360 degrees (as shown) or approximately 270 degrees. Furthermore, it is contemplated that the plurality of portions 26c could include any of the ends as described above in the first embodiment of the illuminated border 10. It is further contemplated that the clips 14c can be formed from extruded plastic, by injection molding or out of metal. In the illustrated example, the clips 14c have a length of approximately one to four inches and are spaced along the top portion 22c of the landscape edging 12c along the landscape edging 12c.

The reference numeral 10d (FIG. 20) generally designates another embodiment of the present invention, having a fifth embodiment for the illuminated border. Since illuminated border 10d is similar to the previously described illuminated border, similar parts appearing in FIGS. 1-6 and FIG. 20, respectively, are represented by the same, corresponding reference number, except for the suffix "d" in the numerals of the latter. The fifth embodiment of the illuminated border 10d is identical to the first embodiment of the illuminated border 10, except that the landscape edging 12d and the clips 14d are integral (such that the clip 14d does not include the portion 26 for connection to the landscape edging 12 or the flange 30), thereby forming a one-piece illuminated border 10d. Furthermore, the flange 32d is connected to the top portion 22d of the landscape edging 12d instead of the portion 26. It is contemplated that the illuminated border 10d can be formed from extruded plastic or metal.

Figure 23:
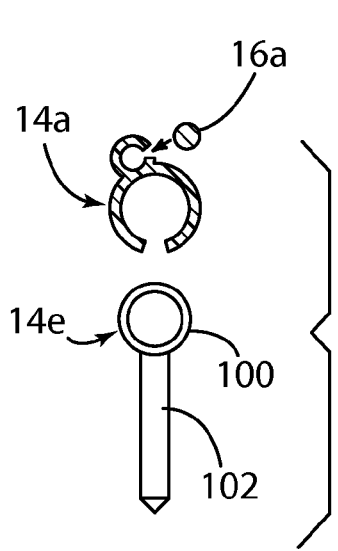
FIG. 23 is an end view of the sixth embodiment of the illuminated border of the present invention in a first assembly step.
Figure 24:
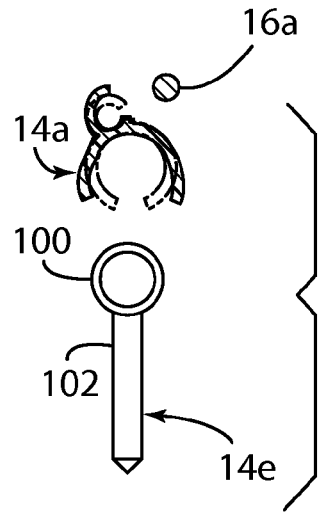
FIG. 24 is an end view of the sixth embodiment of the illuminated border of the present invention in a second assembly step.
Figure 25:
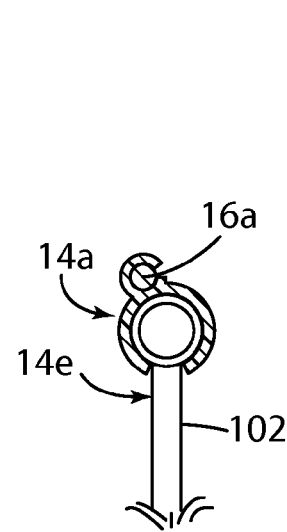
FIG. 25 is an end view of the sixth embodiment of the illuminated border of the present invention in a third assembly step.

The reference numeral 10e (FIGS. 21-22) generally designates another embodiment of the present invention, having a sixth embodiment for the illuminated border. Since illuminated border 10e is similar to the previously described illuminated border, similar parts appearing in FIGS. 1-6 and FIGS. 21-22, respectively, are represented by the same, corresponding reference number, except for the suffix "e" in the numerals of the latter. The sixth embodiment of the illuminated border 10e comprises a plurality of posts that just include a cradle comprising a circular portion 100 for accepting the rope light 16 therein and a stake 102 for sticking into the ground 20e. Alternatively, it is contemplated that any of the clips 14, 14a, 14b, 14c or 14d described above or 14f and 14g described below could be connected to the cradle comprising the circular portion 100, with the rope light being connected to the clip 14, 14a, 14b, 14c or 14d described above or 14f and 14g described below (see, for example, FIGS. 23-25).

Figure 26:
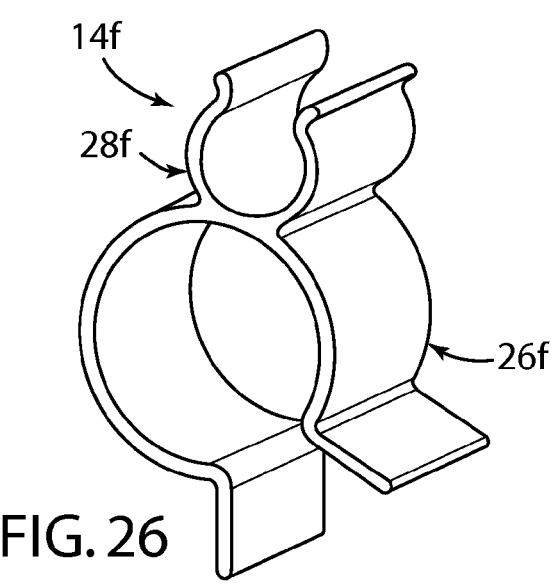
FIG. 26 is a perspective view of a seventh embodiment of a clip of the present invention.

The reference numeral 14f (FIG. 26) generally designates another embodiment of the present invention, having a seventh embodiment for the clip. Since clip 14f is similar to the previously described clip 14, similar parts appearing in FIGS. 1-6 and FIG. 26, respectively, are represented by the same, corresponding reference number, except for the suffix "f" in the numerals of the latter. The seventh embodiment of the clip 14f comprises an edging receiving portion 26f (e.g., C-shaped) for connection to the landscape edging and a C-shaped rope light receiving portion 28f connected to an outside of the edging receiving portion 26f. In use, the rope light receiving portion 28f is configured to accept the rope light as described above. The top circular portion of the landscape edging is inserted into the edging receiving portion 26f of the clip 14f, thereby providing an illuminated border. Preferably, both portions extend for approximately 270 degrees of a circle. It is contemplated that the clips 14f can be formed from extruded plastic, by injection molding or out of metal. In the illustrated example, the clips 14f have a length of approximately one to four inches and a plurality of the clips 14f are spaced along the top circular portion of the landscape edging along the landscape edging.

Figure 26A:
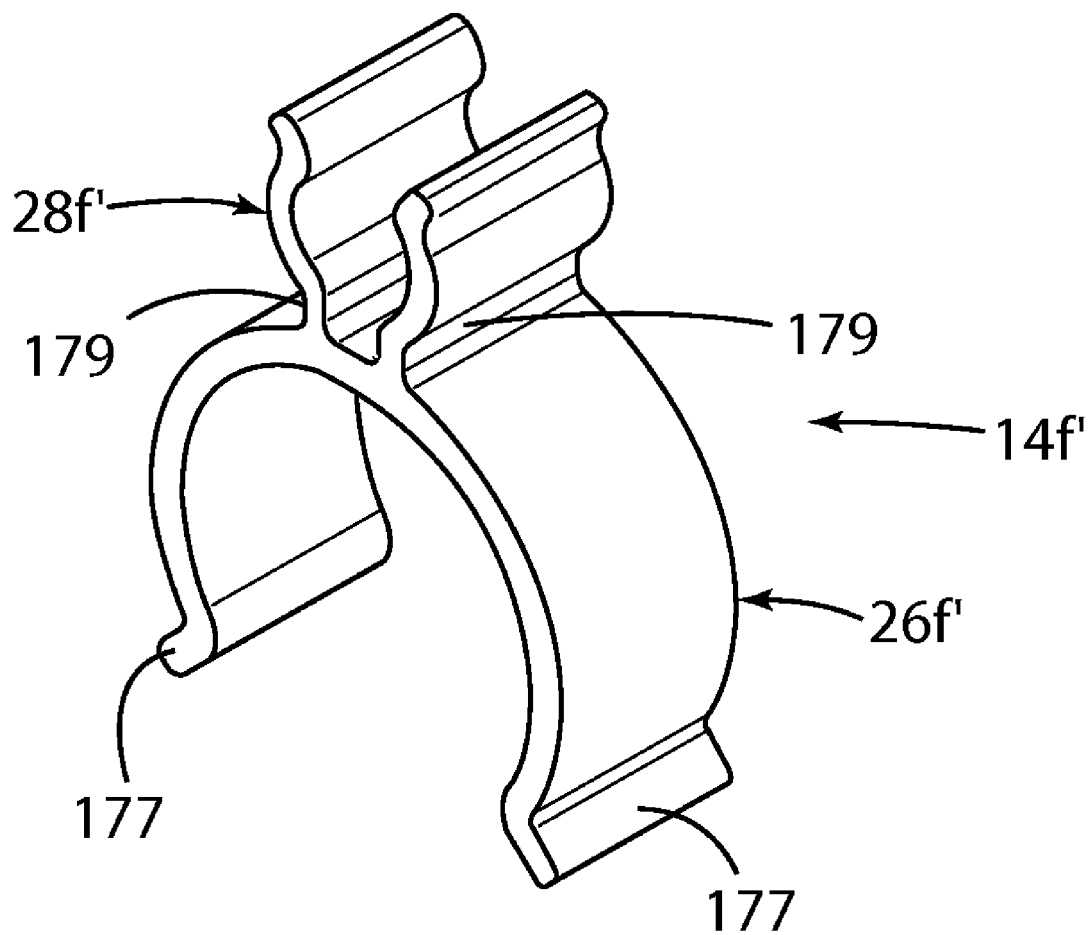
FIG. 26A is a perspective view of a modified version of the seventh embodiment of the clip of the present invention.

The reference numeral 14f' (FIG. 26A) generally designates a modified version of the seventh embodiment for the clip. Since clip 14f' is similar to the previously described clip 14f, similar parts appearing in FIG. 26 and FIG. 26A, respectively, are represented by the same, corresponding reference number, except for the suffix "f'" in the numerals of the latter. The modified version of the seventh embodiment of the clip 14f' comprises an edging receiving portion 26f' (e.g., C-shaped) for connection to the landscape edging and a C-shaped rope light receiving portion 28f' connected to an outside of the edging receiving portion 26f'. As illustrated in FIG. 26A, the C-shaped rope light receiving portion 28f' is located adjacent an apex of the edging receiving portion 26f'. In use, the rope light receiving portion 28f' is configured to accept the rope light as described above. The top circular portion of the landscape edging is inserted into the edging receiving portion 26f' of the clip 14f', thereby providing an illuminated border. Preferably, both portions extend for approximately 270 degrees of a circle. It is noted that the edging receiving portion 26f' could include flared ends 177 for assisting in accepting the top portion of the landscape edging therein. Furthermore, the C-shaped rope light receiving portion 28f' could include substantially parallel walls 179 extending from the edging receiving portion 26f'. It is contemplated that the clips 14f' can be formed from extruded plastic, by injection molding or out of metal. In the illustrated example, the clips 14f' have a length of approximately one to four inches and a plurality of the clips 14f' are spaced along the top circular portion of the landscape edging along the landscape edging.

Figure 27:
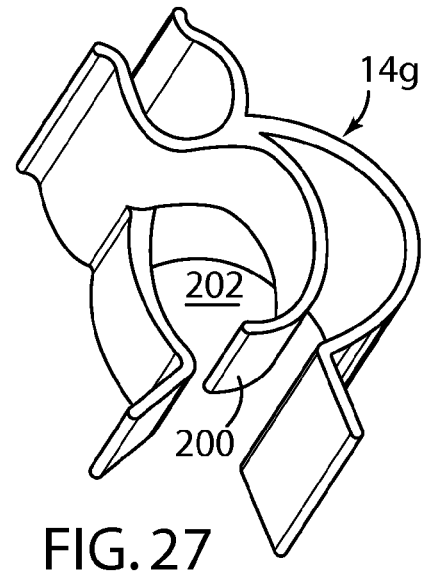
FIG. 27 is a perspective view of an eighth embodiment of a clip of the present invention.
Figure 28:
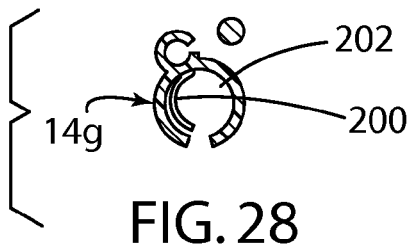
FIG. 28 is a front view of the eighth embodiment of the clip of the present invention.

The reference numeral 14g (FIGS. 27 and 28) generally designates another embodiment of the present invention, having an eighth embodiment for the clip. Since clip 14g is similar to the previously described seventh embodiment of the clip 14f, similar parts appearing in FIG. 26 and FIGS. 27-28, respectively, are represented by the same, corresponding reference number, except for the suffix "g" in the numerals of the latter. The eighth embodiment of the clip 14g is substantially identical to the seventh embodiment of the clip 14f, except that the eighth embodiment of the clip 14g includes an arcuate adapter leg 200 extending into a space 202 defined by an interior of the edging receiving portion 26f. The arcuate adapter leg 200 is configured to help support the clip 14g on an edging having a top circular portion that has a smaller outer periphery than the inner periphery of the edging receiving portion 26f or an edging having a planar top (e.g., without the top circular portion). It is contemplated that any of the clips 14, 14a, 14b, 14c, 14d or 14f described above could include the arcuate adapter leg 200.

Figure 29:
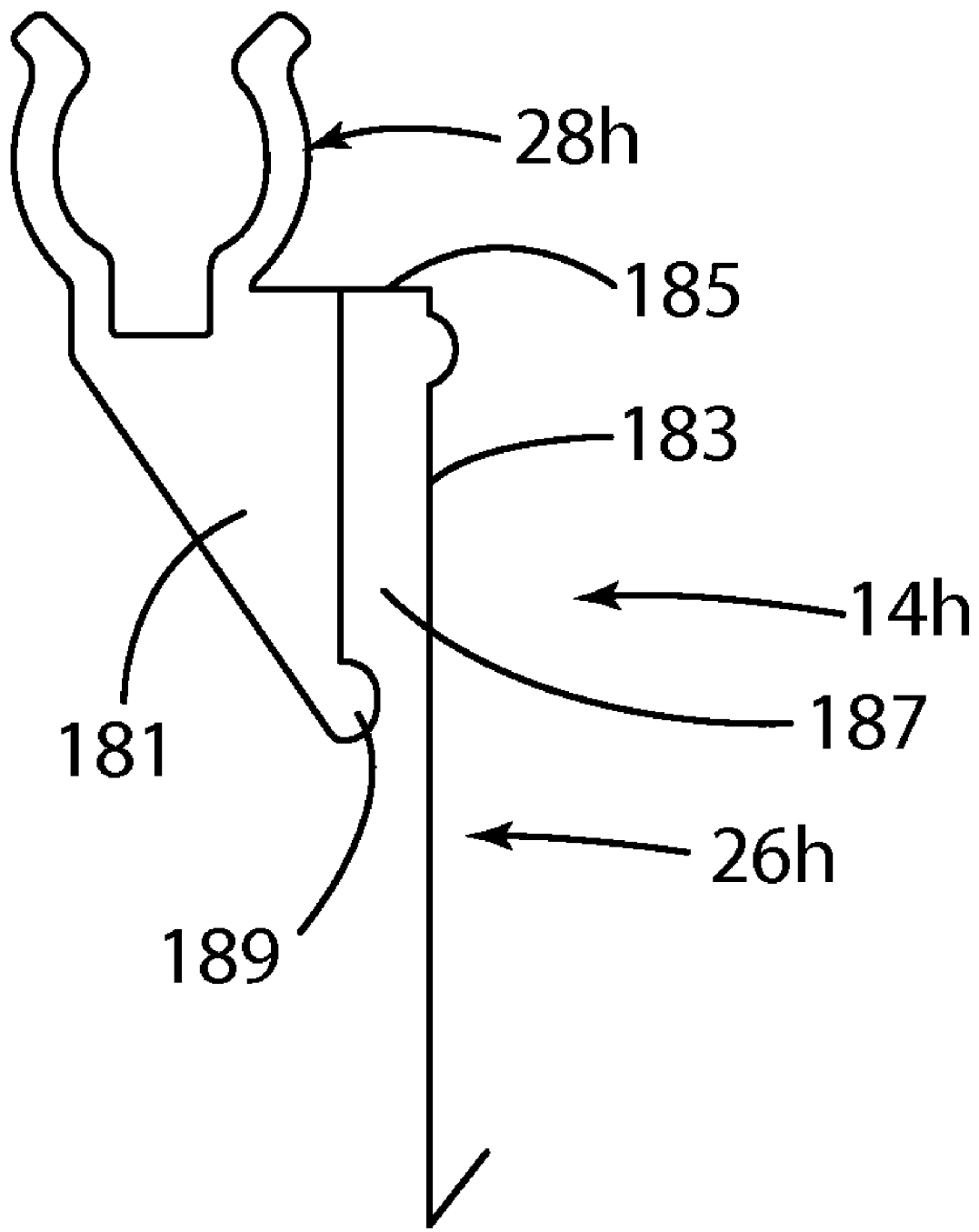
FIG. 29 is a front view of a ninth embodiment of a clip of the present invention.

The reference numeral 14h (FIG. 29) generally designates another embodiment of the present invention, having a ninth embodiment for the clip. Since clip 14h is similar to the previously described embodiment of the clip 14, similar parts appearing in FIGS. 1-6 and FIG. 29, respectively, are represented by the same, corresponding reference number, except for the suffix "h" in the numerals of the latter. The ninth embodiment of the clip 14h includes an edging receiving portion 26h for connection to the landscape edging and a C-shaped rope light receiving portion 28h connected to an outside of the edging receiving portion 26h. The edging receiving portion 26h is configured to be connected to landscape edging 12 that does not include a top portion 22 (for example, metal edging such as the edging 12 shown in FIGS. 14 and 15 above). The edging receiving portion 26h includes a first side wall 181 and a second side wall 183 connected by a top spanning portion 185. The first side wall 181, the second side wall 183 and the top spanning portion 185 define a slot 187 for accepting the top of the edging therein. In the illustrated embodiment, the C-shaped rope light receiving portion 28h is connected to the first side wall 181 of the edging receiving portion 26h. However, it is contemplated that the C-shaped rope light receiving portion 28h could be connected to the second side wall 183 or the top spanning portion 185 of the edging receiving portion 26h. Furthermore, it is contemplated that the first side wall 181 and/or the second side wall 183 could include a projection 189 extending into the slot 187 to assist in maintaining the top of the edging within the slot 187. It is contemplated that the clips 14h can be formed from extruded plastic, by injection molding or out of metal. In the illustrated example, the clips 14h have a length of approximately one to four inches and a plurality of the clips 14h are spaced along the top circular portion of the landscape edging along the landscape edging.

The foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. For example, it is contemplated that the illuminated border could include a cap that would fit over the clip and/or the rope light to prevent light for escaping, thereby allowing certain sections of the illuminated border from emitting light. Furthermore, it is contemplated that the all of the clips discussed above could include multiple rope light receiving portions or cradles (i.e., more than one) and associated flanges 32. Moreover, it is contemplated that every part of the illuminated border (e.g., edging and/or clip and/or cradle) could be made of metal or plastic.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A lawn decoration comprising:
   edging including an elongated post portion for sticking into the ground and an elongated enlarged top at a top of the post portion; and
   a clip connected to the edging, the clip including at least one edging accepting portion and a light source accepting portion, the edging accepting portion defining an opening;
   the clip being connected to the edging by placing the top of the edging into an area defined by the edging accepting portion of the clip through the opening; and
   a light source located in the light source accepting portion of the clip;
   wherein the light source accepting portion is connected to a top portion of the clip opposite the opening; and
   wherein the light source is a light rope.

2. The lawn decoration of claim 1, wherein:
   the clip further includes a planar flange extending outwardly from the at least one edging accepting portion, the planar flange abutting against a substantially planar surface of the elongated post portion of the edging.

3. The lawn decoration of claim 1, wherein:
   a length of the clip in a direction along a center of the edging accepting portion is approximately 1-4 inches.

4. The lawn decoration of claim 1, wherein:
   the light rope is flexible.

5. The lawn decoration of claim 1, wherein:
   the elongated post portion of the edging includes a prong for holding the edging in the ground.

6. The lawn decoration of claim 1, wherein:
   the clip includes an L-shaped receiving leg extending from the light source accepting portion.

7. The lawn decoration of claim 1, wherein:
   the at least one edging accepting portion comprises a plurality of edging accepting portions; and
   the clip comprises the plurality of edging accepting portions connected to the light source accepting portion.

8. The lawn decoration of claim 1, wherein:
   the clip includes an arcuate adapter leg extending into the area to adapt the clip to connect to any sized edging.

9. The lawn decoration of claim 1, wherein:
   a length of the clip in a direction along a center of the edging accepting portion is approximately 1-4 inches;
   the light source is flexible; and
   the light source accepting portion of the clip includes a slot for accepting the light source therethrough.

10. The lawn decoration of claim 9, wherein:
    the clip includes an adapter leg extending into the area to adapt the clip to connect to any sized edging; and
    the elongated post portion of the edging includes a prong for holding the edging in the ground.

11. The lawn decoration of claim 1, wherein:
    the edging accepting portion covers more than 270 degrees of a circle.

12. The lawn decoration of claim 11, wherein:
    the light source accepting portion of the clip is substantially annular and includes a slot for accepting the rope light therethrough.

13. A lawn decoration comprising:
    edging including an elongated post portion for sticking into the ground and an elongated enlarged top at a top of the post portion; and
    a clip connected to the edging, the clip including at least one edging accepting portion and a light source accepting portion, the edging accepting portion defining an opening;
    the clip being connected to the edging by placing the top of the edging into an area defined by the edging accepting portion of the clip through the opening; and
    a light source located in the light source accepting portion of the clip;
    wherein the light source accepting portion is connected to a top portion of the clip opposite the opening; and
    wherein the light source accepting portion of the clip is substantially annular and includes a slot for accepting the light source therethrough; and
    wherein the slot opens into the at least one edging accepting portion of the clip.

* * * * *